United States Patent [19]

Brower et al.

[11] Patent Number: 4,860,675

[45] Date of Patent: Aug. 29, 1989

[54] AUTOMATIC QUILTING MACHINE FOR SPECIALIZED QUILTING OF PATTERNS WHICH CAN BE CONTROLLED BY A REMOTE JOY STICK AND MONITORED ON A VIDEO SCREEN

[75] Inventors: David Brower, Tarzana; Thomas K. Jernigan, Canoga Park, both of Calif.

[73] Assignee: TD Quilting Machinery, Burbank, Calif.

[21] Appl. No.: 220,734

[22] Filed: Jul. 18, 1988

[51] Int. Cl.$^4$ .................. D05B 11/00; D05B 35/00
[52] U.S. Cl. ..................... 112/119; 112/121.12; 112/262.1; 112/262.3
[58] Field of Search ............ 112/119, 117, 118, 121.12, 112/121.11, 103, 457, 262.3, 266.1; 364/470, 400

[56] References Cited

U.S. PATENT DOCUMENTS

| | | | |
|---|---|---|---|
| 1,958,893 | 5/1934 | Kintner | 358/108 X |
| 3,312,184 | 4/1967 | Cash | 112/118 |
| 3,377,968 | 4/1968 | Story | 112/118 X |
| 3,500,777 | 3/1970 | Kalning | 112/118 |
| 3,757,710 | 9/1973 | Landoni | 112/118 |
| 4,188,893 | 2/1980 | Shimazaki | 112/121.11 |
| 4,262,613 | 4/1981 | Landoni | 112/121.12 X |
| 4,385,570 | 5/1983 | Yanagi | 112/262.1 X |
| 4,403,559 | 9/1983 | Hirose | 112/121.12 |
| 4,429,364 | 1/1984 | Maruyama | 112/121.11 X |
| 4,498,404 | 2/1985 | Sadeh | 112/121.12 |
| 4,526,166 | 7/1985 | Münnel | 112/121.12 X |
| 4,583,181 | 4/1986 | Gerber | 364/470 |
| 4,660,484 | 4/1987 | Yasui | 112/121.12 X |
| 4,669,405 | 6/1987 | Resta et al. | 112/119 X |
| 4,674,421 | 6/1987 | Iwase | 112/121.12 |
| 4,759,302 | 7/1988 | Yanagi | 112/121.12 |
| 4,784,071 | 11/1988 | Sadeh et al. | 112/121.12 |

*Primary Examiner*—Peter Nerbun
*Attorney, Agent, or Firm*—Thomas I. Rozsa

[57] ABSTRACT

A automatic quilting machine for use in stitching individual selected patterns into a large fabric such as a bedspread or quilt. The bedspread or quilt is stretched on a large metal frame which is mounted on a table which can be moved in the X-direction, the Y-direction, or any X-Y combination direction through an automatic joy stick. The sewing machine head is mounted on a cross beam which is aligned at the approximate center point of the metal frame on which the fabric is stretched. The needle of the sewing machine head can stitch a pattern into any location in the fabric and the metal frame is moved in any direction relative to the fixed sewing machine head in order to bring the desired stitch location on the fabric into alignment with the sewing machine head. The precise location of the sewing machine needle and fabric is illuminated and a color video camera which is mounted on the cross beam holding the sewing machine head is also focused on this location. The color video camera is connected to a television monitor so that a visual image of the sewing machine needle and fabric as a stitch is being made can be delivered to the monitor. A machine operator can control the movement of the metal frame through positioning by a remote joy stick and can see the stitch being made by viewing the monitor.

31 Claims, 3 Drawing Sheets

AUTOMATIC QUILTING MACHINE FOR SPECIALIZED QUILTING OF PATTERNS WHICH CAN BE CONTROLLED BY A REMOTE JOY STICK AND MONITORED ON A VIDEO SCREEN

BACKGROUND OF THE INVENTION

1. Field of the Invention

The field of the present invention relates to frame quilting machines which are large table-like structures used to sew patterns into large textile items; in particular bedspreads and quilts. The field of the present invention also relates to industrial sewing machine apparatus and processes used to sew patterns and stitching into large fabrics, which sewing operation is not easily performed on conventional sewing machines

2. Description of the Prior Art

Industrial sewing machine operations are known in the prior art. Patterns and stitching into fabrics is commonly performed on industrial sewing machines. The operator hand guides the fabric between the needle and the sewing machine table and the pattern is sewn into the fabric. This process is practical for small pieces of fabric and is commonly done on piece goods such as garments. When handling larger pieces of fabric such as a roll of fabric, a method known in the prior art is roll to roll sewing. The sewing machine head is located along an X-axis and the material is unwound from a roll and caused to move transverse to the sewing machine head such that the fabric moves along a Y-axis. The sewing machine sews a stitch into the large fabric as the head moving along the X-axis and the fabric moving along the Y-axis intersect each other. The fabric is then wound onto a second receiving roll.

When sewing a very large piece of fabric such as a bedspread or quilt, a frame quilting machine is used. The frame quilting machine comprises a large frame, usually made of metal, onto which the fabric to be sewn is spread. Commonly, the pattern is sewn by a sewing machine guided by a computer into which a predetermined pattern has been programmed. The fabric remains stationary on the frame and the sewing machine head moves along the fabric and stitches in the predetermined pattern.

Sewing machines and various frame quilting apparatus and processes have previously been patented. The following is representative of the types of apparatus and processes which have been patented:

1. U.S. Pat. No. 4,188,893 issued to Shimazaki in 1980 for "Device Of Detecting Cloth Feeding Amount In Sewing Machines".

2. U.S. Pat. No. 3,377,968 issued to Story in 1968 for "Material Holding And Guide Attachment For Sewing Machine".

3. U.S. Pat. No. 4,429,364 issued to Maruyama et al. in 1984 for "Sewing Machine-Pattern Data Processor".

4. U.S. Pat. No. 1,958,893 issued to Kintner et al. in 1934 for "Photosensitive Apparatus".

5. U.S. Pat. No. 4,583,181 issued to Gerber et al. in 1986 for "Fabric Flow Related System".

6. U.S. Pat. No. 3,500,777 issued to Kalning et al in 1970 for "Quilting Apparatus".

7. U.S. Pat. No. 3,757,710 issued to Landoni in 1973 for "Automatic Quilting Machine".

8. U.S. Pat. No. 3,312,184 issued to Cash in 1967 for "Quilting Machine Of The Endless Guide Track Type".

9. U.S. Pat. No. 4,526,116 issued to Männel in 1985 for "Method And Arrangement To Control An Automatic Embroidery Machine".

U.S. Pat. No. 4,188,893 to Shimazaki discloses an apparatus for test running a pattern by matting the X-Y grid on an oscilloscope in order to test the pattern to be sure that the proper pattern is run before actual cloth is used (and wasted).

U.S. Pat. No. 1,958,893. to Kintner et al. discloses the use of a video camera in conjunction with a missile projecting apparatus. The camera has a photosensitive eye for regulating the activity of the apparatus, wherein the position of the photo-sensitive eye and the projecting device are so related that the missiles are projected in accordance with the position of the target.

U.S. Pat. No. 3,377,968 to Story illustrates a particular type of guiding apparatus for holding material and guiding it relative to the sewing machine.

U.S. Pat. No. 3,500,777 to Kalning et al. illustrates what is now the well known quilting machine with multiple sewing heads.

U.S. Pat. No. 3,312,184 to Cash illustrates a quilting machine which allows independent movement of the quilt holder in any direction. The machine is capable of sewing two or three reproductions of the same sewing line into the same quilt at the same time.

U.S. Pat. No. 4,526,116 to Mannel discloses an automatic quilting machine wherein a video camera is used to pick up certain patterns of a motif carrier and transmit them to the sewing machine. Here, the pattern is automatic from a predetermined pattern.

U.S. Pat. No. 3,757,710 to Landoni discloses an automatic quilting machine where the heads can be changed so that certain patterns of stitching paths can be alternated with one or more types of different patterns.

U.S. Pat. No. 4,429,364 issued to Maruyama involves a computer operated pattern input for a sewing machine.

U.S. Pat. No. 4,583,181 issued to Geber discloses a device to assist an operator in dealing with flaws encountered during the spreading of web material to be cut.

None of the known prior art apparatus including those disclosed in the above patents enables an operator to individually hand sew an individual pattern into a large piece of fabric such as a bedspread or quilt while remaining at a remote position from the fabric. In present day operations, such hand sewn operations require the operator to physically be above the quilting table, which can be almost 12 feet square, and hand sew the pattern into the fabric. This is a very expensive and time consuming process. The only known apparatus for sewing patterns into the quilt is disclosed in the Mannel patent wherein a video camera is used to pick up certain patterns of a motif carrier and transmit them to the sewing machine. Here, the pattern is automatic from a predetermined pattern. More expensive and finer quilts and bedspreads are those which have individual patterns sewn into them and can be advertised as having "hand sewn" individual patterns. Therefore, there is a significant need for an apparatus and process which enables hand sewn individual patterns to be sewn into large fabrics such as quilts and bedspreads in an efficient manner where the worker or workers do not have to be guided above the large laid out fabric and hand sew the patterns into the fabric.

SUMMARY OF THE PRESENT INVENTION

The present invention relates to an automatic quilting machine for use in stitching individual selected patterns into a large fabric such as a bedspread or quilt. The bedspread or quilt is stretched on a large metal frame which is mounted on a table which can be moved in the X-direction, the Y-direction, or any X-Y combination direction through an automatic joy stick. The sewing machine head is mounted on a cross beam which is aligned at the approximate center point of the metal frame on which the fabric is stretched. The needle of the sewing machine head can stitch a pattern into any location in the fabric and the metal frame is moved in any direction relative to the fixed sewing machine head in order to bring the desired stitch location on the fabric into alignment with the sewing machine head. The precise location of the sewing machine needle and fabric is illuminated and a color video camera which is mounted on the cross beam holding the sewing machine head is also focused on this location. The color video camera is connected to a television monitor so that a visual image of the sewing machine needle and fabric as a stitch is being made can be delivered to the monitor. A machine operator can control the movement of the metal frame through positioning by a remote joy stick and can see the stitch being made by viewing the monitor. Therefore, instead of being required to hang over the frame quilting machine to observe the pattern being stitched, the operator can view the entire stitching process from a remote location be viewing the stitch on the video monitor and can direct the movement of the table relative to the fixed sewing machine head in order to position the fabric for successive stitches while remaining at a remote location from the frame quilting machine.

In general, this is a frame quilting machine. A bedspread, comforter, quilt, etc. is stretched securely on a metal frame. It is placed on an X-Y positioning table for movement controlled through a sewing machine. The sewing machine has been modified and mounted on a steel frame (two cross beams top and bottom) that can accommodate twelve feet by twelve feet six inches of stitching dimensions. Of course it can be made larger or smaller. The machine has been engineered and built to satisfy increased production needs of manufacturers who supply "custom, hand-guided, or outline quilted patterns". The four key elements of the present invention are: (a) sewing and auxiliary functions; (b) X-Y movement of the table controlled by a remote joy stick; (c) video camera and monitor; and (d) the electronic coordination of movement and sewing speeds relative to direction and distance of travel of the remote joy stick.

It has been discovered, according to the present invention, that if a video camera connected to a television monitor is focused on the location of the sewing needle and bedspread or quilt location where the needle is stitching the thread into the bedspread or quilt, and the area is further illuminated to provide a clear view, an operator can view the entire stitching process from a remote location and does not have to spend time consuming effort in positioning himself over the frame quilting machine to determine the position of the stitch.

It has further been discovered, according to the present invention, that if a frame quilting machine can be moved relative to fixed sewing machine head in the X-direction the Y-direction or any X-Y combination direction by a remote operating means such as a joy stick, and the frame quilting machine comprises a metal table or frame on which a bedspread or quilt is stretched such that the surface area of the bedspread or quilt is open and unobstructed, and the metal frame can move relative to and between a pair of cross beams which hold a sewing machine head and plate, then an operator can cause the bedspread or quilt to be precisely stitched in any desired pattern by moving the metal frame or quilting table relative to the fixed cross beams housing the sewing machine components in any desired direction to arrive at any desired location on the bedspread or frame where a stitch or pattern is to be sewn. If the area of the sewing machine head and stitch is further illuminated by a source of light and visually displayed by a video camera fixed to one of the cross beams and focused on the area of the sewing machine needle and bedspread or quilt, and the picture is transmitted to a monitor, then an operator can be positioned at a remote location and observe the precise formation of the stitch and direction of the pattern being sewn into the bedspread or quilt and can cause the quilting table to move relative to the sewing machine head in order to bring any desired location of the bedspread or quilt into alignment with the sewing machine head so that any desired hand selected pattern or individual pattern can be sewn into the large bedspread or quilt in an efficient manner.

It has additionally been discovered, according to the present invention, that if an operator can control the movement of the frame table on which the fabric is stretched and can see the precise location of the stitch being made in the fabric from a remote location, the amount of training time required to teach the operator to use the present system is much less than the time used to teach an operator to sew with the prior art frame quilting machines. In addition, the risk of injury to the operator is significantly reduced and the speed of production is significantly increased.

It is therefore an object of the present invention to provide an apparatus by which an operator can reman at a remote location from a large frame quilting machine and cause a precise hand selected pattern to be sewn into the large bedspread, comforter, quilt, or other fabric which is held on the metal frame or table of the frame quilting machine.

It is another object of the present invention to provide an apparatus which enables frame quilting for specialized hand selected patterns to be quickly and efficiently performed with a minimum amount of training time of the operator It is a further object of the present invention to provide an apparatus which can accommodate computerized pattern quilting of a predetermined computer generated patters and also accommodate specialized hand selected patterns, or any combination thereof, in the same unit.

It is an additional object of the present invention to increase the rate of production of hand guided patterns sewn into large fabrics such as bedspreads or quilts.

It is an additional object of the present invention to enable a hand selected pattern to be sewn into a large fabric such as a bedspread or comforter while an operator is positioned at a distance remote from the moving parts of the machine such as the frame table and sewing machine needle, to thereby significantly reduce the risk of injury to an operator.

Further novel features and other objects of the present invention will become apparent from the following detailed description, discussion and the appended claims, taken in conjunction with the drawings.

DRAWING SUMMARY

Referring particularly to the drawings for the purpose of illustration only and not limitation, there is illustrated:

FIG. 1 is a perspective view of the present invention automatic quilting machine for specialized quilting of patterns which can be controlled by a remote joy stick and monitored on a video screen.

FIG. 2. is a block diagram of the components of the electronic control components of the present invention automatic quilting machine.

DETAILED DESCRIPTION OF THE PREFERRED EMBODIMENT

Although specific embodiments of the invention will now be described with reference to the drawings, it should be understood that such embodiments are by way of example only and merely illustrative of but a small number of the many possible specific embodiments which can represent applications of the principles of the invention. Various changes and modifications obvious to one skilled in the art to which the invention pertains are deemed to be within the spirit, scope and contemplation of the invention as further defined in the appended claims.

Figures 1, 2:
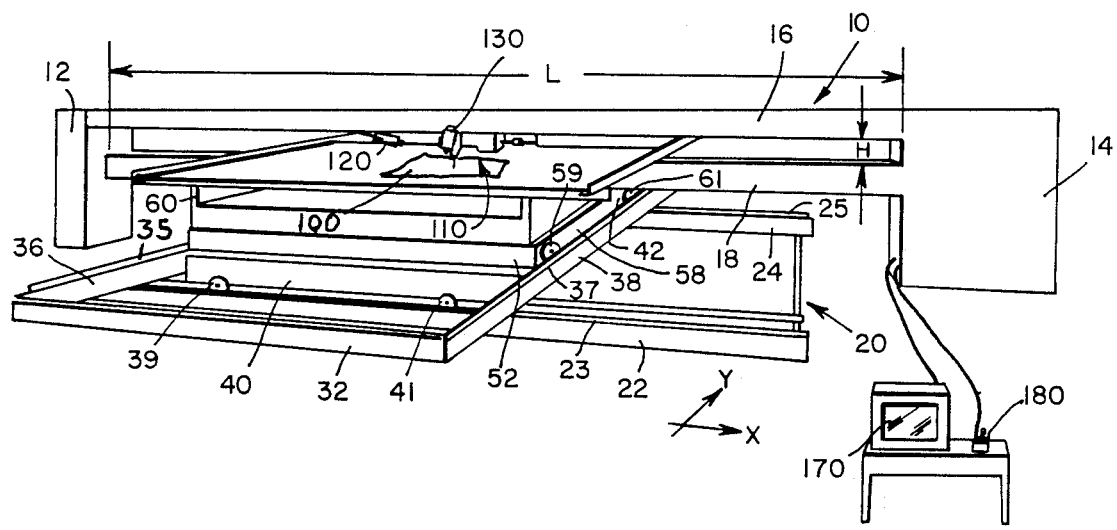

Referring to FIG. 1, the main structural elements of the present invention automatic quilting machine for specialized quilting of patterns which can be controlled by a remote joy stick and monitored on a video screen (hereinafter referred to as "automatic quilting machine") will be discussed first. The entire automatic quilting machine is designated as 10. The main structural member of the automatic quilting machine 10 is a pair of posts of box members, comprising a left box member 12 and a right box member 14. By way of example, the left box member 12 which serves only as a support member can be made of quarter inch plate steel and can have a base which is twenty inches wide by twenty-four inches deep and fifty-two inches tall. The right box member 14 which includes the electronics and motors, as will be described later, in addition to acting as a support member, can also be made of quarter inch plate steel and can have a base which is forty-four inches wide by twenty-four inches deep and fifty-two inches tall. The two support boxes 12 and 14 support a pair of cross beams; an upper cross beam 16 and a lower cross beam 18. Upper cross beam 16 can be made of quarter inch plate steel and can be twenty-four feet long four inches wide and eight inches tall. Lower cross beam 18 can be made of quarter inch plate steel and can be twenty-four feet long, eight inches wide and eightinches tall. As illustrated in FIG. 1, the two beams 16 and 18 run parallel to each other between support box members 12 and 14, and are separated by a gap "H" which by way of example may be nine and a half inches. The cross beams 16 and 18 are permanently attached to the supporting box members 12 and 14 by conventional means such as welding.

Figure 3:
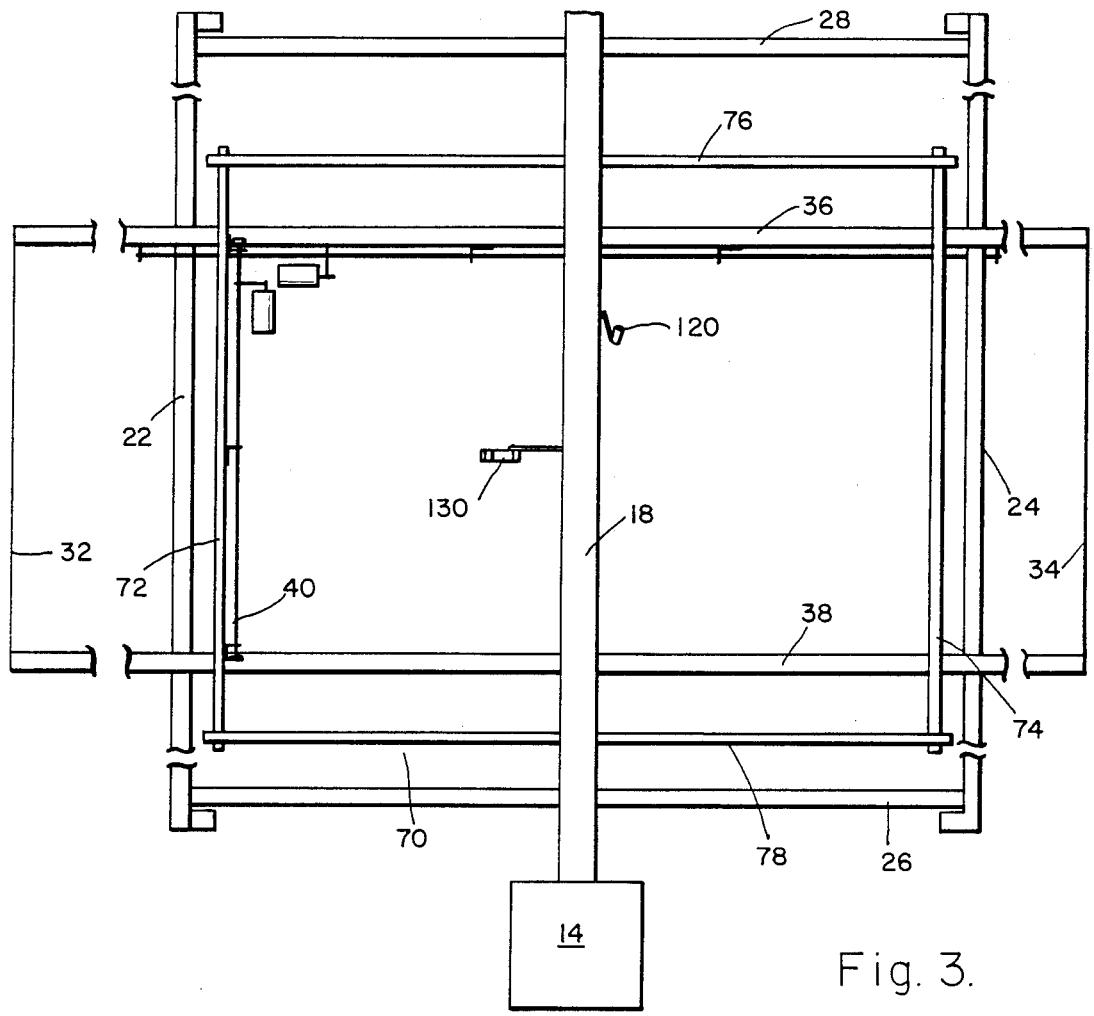
FIG. 3 is a top plan view of the main body of the present invention automatic quilting machine.

Referring to FIGS. 1 and 3, on the ground between the supporting box members 12 and 14 and beneath the lowermost cross beam 18 is the base track 20. The base track 20 is comprised of track supports 22 and 24 which support thereon a gear and rack system which will be described in greater later on. Track support 22 further comprises a track 23 on which a pair of rollers may roll. Track support 24 further comprises a track 25 on which a pair of rollers may roll. The track supports 22 and 24 are aligned parallel to each other and are attached by means of transverse spacing members 26 and 28 which also run parallel to each other, thereby forming a generally square base which rests on the ground. Resting immediately above the base track 20 is a first movable support member track 30. The first movable support member track 30 is comprised of a pair of parallel X-direction beams 32 and 34 and a pair of Y direction beams 36 and 38 which are connected together for form a generally rectangular frame. The frame comprised of members 32, 34, 36 and 38 of first movable support member 30 support transverse roller members 40 and 42. Transverse roller member 40 is supported between Y direction beams 36 and 38 and is generally parallel to X-direction beams 32 and 34 and is aligned directly over track support 22. Transverse roller member 40 further comprises a pair of rollers 39 and 41. Transverse roller member 42 is supported between Y-direction beams 36 and 38 and is generally parallel to X-direction beams 32 and 34 and is aligned directly over track support 24. Transverse roller member 42 further comprises a pair of rollers (not shown). First movable support track 30 can move in the X direction as the rollers on transverse roller members 40 and 42 can roll on the track 23 contained on track support 22 and on track 25 contained on track support 24 respectively. Y-direction beam 36 further comprises a track 35 and Y-direction beam 38 further comprises a track 37. Y-direction beams 36 and 38 further comprise gear and rack assemblies, as will be described later.

Resting immediately above the first movable support member track 30 is a second movable support member track 50. The second movable support member track 50 is comprised of a pair of parallel X-direction beams, one of which is shown at 52 and a pair of Y-direction beams, one of which is shown at 58, which are connected together form a generally rectangular frame. The Y-direction beams on the second movable support member track 50 each further comprise a pair of rollers which enable the second movable support track 50 to move in the Y-direction. Y-direction beam 58 comprises a pair of rollers 59 and 61 which move on track 37 and Y-direction beam 56 comprises a pair of rollers (not shown) which move on track 35.

Second movable track member 50 further comprises four posts at its corners, two of which, 60 and 62 are shown in FIG. 1. The four posts support quilt table 70 which is comprised of X-direction table beams 72 and 74 and Y-direction table beams 76 and 78, connected together by means such as welding. X-direction table beam 72 is supported on posts 60 and 62 and X-direction table beam 74 is supported on the two opposite posts (not shown). Y-direction table beams 76 and 78 are supported on the two X-direction table beams 76 and 78 adjacent their respective ends, as shown in FIGS. 1 and 3. The two X-direction table beams 72 and 74 are parallel to each other and the two Y-direction table beams 76 and 78 are parallel to each other.

As illustrated in FIGS. 1 and 3, the posts on second movable track member 50 support the table beams such that the table beams 76 and 78 pass through gap H between cross beams 16 and 18 and table beams 72 and 74 can pass through the gap H if the Y direction movement is of sufficient length. In operation, a bedspread or quilt 100 is stretched across the table beams 72, 74, 76, and 78, which by way of example can form a table surface of approximately twelve feet in the X-direction by twelve and a half feet in the Y-direction, such that the quilt 100 is supported at its edges by the four table beams 72, 74, 76 and 78 which result in a fully accessible quilt over its entire interior upper and lower surface. The table beams are caused to move in the X-direction by first movable support track 30 as the rollers on transverse roller members 40 and 42 move along tracks 23 and 25 respectively. The length "L" of gap "H" is preferably at least twice the length of the two X-direction table beams 72 and 74. In this way, the entire X-direction area of the quilt table 70 can be reached by the centermost position along the cross beams 16 and 18. The table beams are caused to move in the Y direction by second movable support member track 50 when the rollers on its Y-direction beams move along tracks 35 and 37. The length of tracks 35 and 37 is at least twice the length of the two Y-direction table beams 76 and 78. In this way, the entire Y-direction area of the quilt table 70 can be reached by the centermost position along the cross beams 16 and 18. Through this combination of X and Y movements, the entire area of the quilt table 70 and the quilt 100 spread thereon can be reached by the centermost position of cross beams 16 and 18. In the preferred starting position, the quilt table 70 is centered relative to the cross beams 16 and 18 and can move in any X-Y direction relative the the centermost position of the cross beams.

Figure 4:
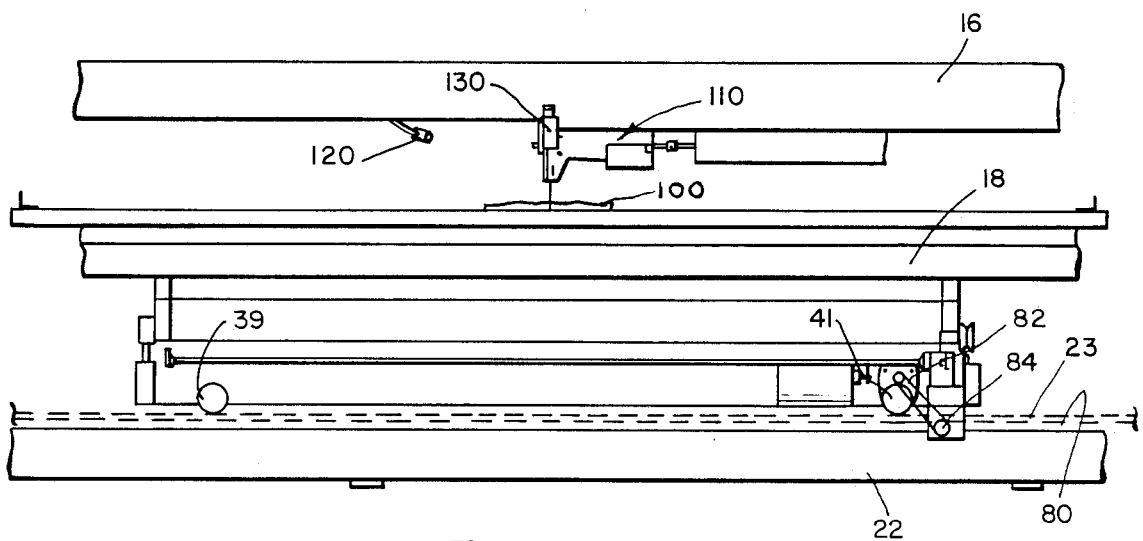
FIG. 4 is a front elevational view of the present invention automatic quilting machine.

The quilt table 70 can be caused to move in the X and Y directions as previously described by numerous conventional types of means, such as a gear and rack assembly. One such gear and rack assembly is illustrated in FIG. 4. Track support 22 supports track 23 on which rollers 39 and 41 can roll in the X-direction. Track support 22 further contains on its interior surface a rack assembly 80 having a conventional multiplicity of teeth which can accommodate a gear. Transverse roller member 40 further supports a rotatable gear 82 which is caused to rotate by a conventional gear drive mechanism 84 having smaller gears driven by a belt to drive the rotatable gear 82. The gear drive mechanism is driven by a conventional linkage hookup to a drive motor which causes a motor shaft to rotate and thereby drive the gear drive mechanism 84 which in turn causes the rotatable gear 82 to rotate. When the rotatable gear rotates in the clockwise direction, the rotatable gear moves along the rack assembly 80 and causes the transverse roller member 40 (and opposite transverse roller member 42) to move to the right in the X-direction. When the rotatable gear rotates in the counterclockwise direction, the rotatable gear moves along the rack assembly 80 and causes the transverse roller member 40 (and opposite transverse roller member 42) to move to the left in the X-direction. It will be appreciated that a comparable rack and gear assembly is supported on Y-direction beam 38 and Y-direction beam 58, thereby enabling Y-direction beams 58 (and the opposite Y-direction beam on second movable support member track 50) to move back and forth in the Y-direction.

It will be appreciated that conventional adjustment modifications can be incorporated into this system. For example the overall height of the quilt table 70 can be adjusted up and down by creating slidable adjustments in the the posts (60, 62 and to two opposite posts) in order to adjust the height of quilting table 70 relative to the cross beams 16 and 18.

Figure 5:
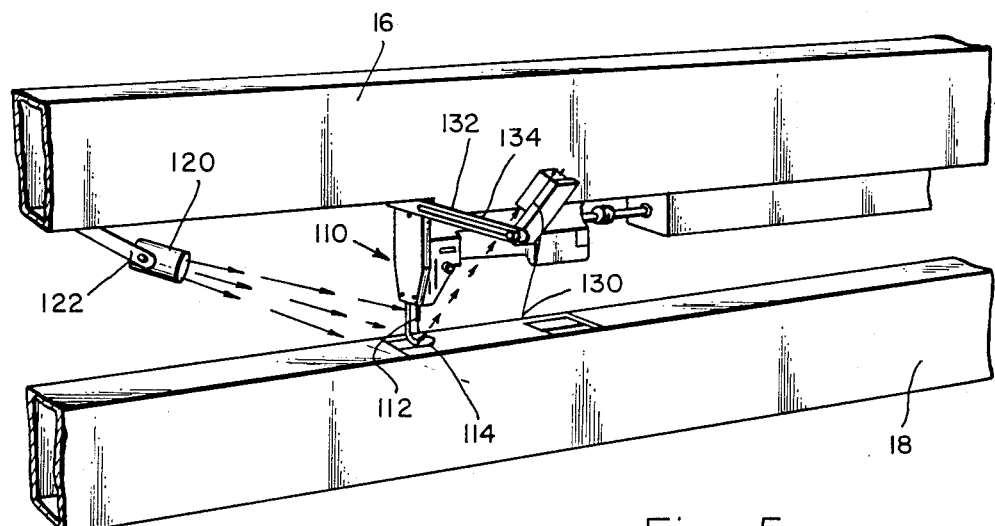
FIG. 5 is an enlarged perspective view of the front portion of the main support beam and attachments thereto.
Figure 6:
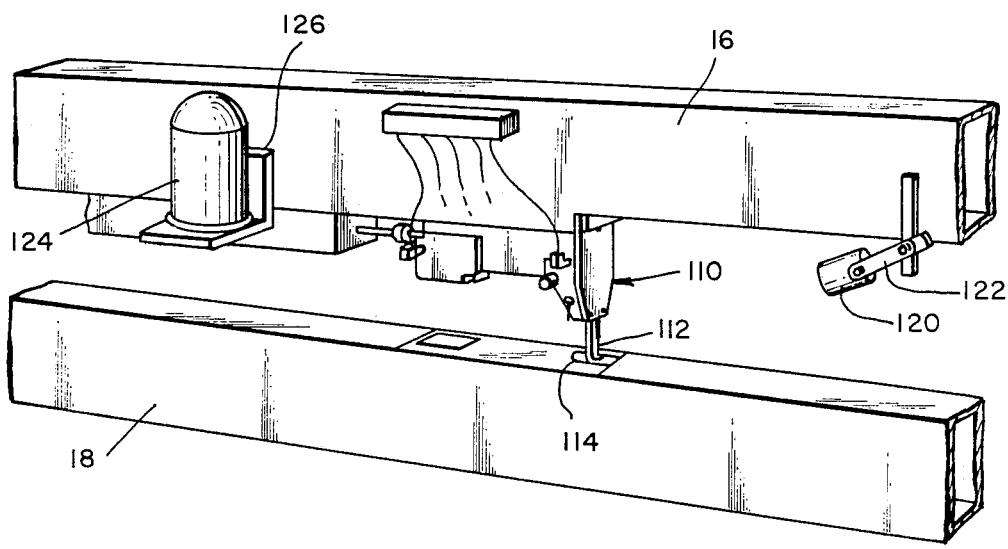
FIG. 6 is an enlarged perspective view of the rear portion of the main support beam and attachments thereto.

Referring to FIGS. 4, 5, and 6, a sewing machine head 10 is bolted stationary to upper cross beam 16. Any industrial machine sewing head which is suitable for the intended sewing purpose can be incorporated with the present invention. By way of example, one type of sewing machine head which can be used with the present invention is the Mitsubishi Industrial Sewing Machine Model LS2-180 high speed, single needle lockstitch sewing machine. A microprocessor connected to this type of sewing machine head provides many auxiliary functions such as control of needle position, presser foot lift, undertrim, and tension release disk. The sewing machine head 110 is attached to the underside of upper cross beam 16 such that the sewing needle 112 is at the approximate center of cross-beam 16. In this manner, the sewing needle 112 can reach any portion of the quilt table 70 and quilt 100 thereon by the X-Y movement of the quilt table, as previously discussed. The sewing machine plate 114 is formed into the top of lower cross beam 18 such that the plate 114 is aligned with the needle 112, as best illustrated in FIG. 6.

A source of light 120 is attached, preferably to the upper cross beam 16 and directed such that the beam of light falls directly on the intersection area between the sewing needle 112 and the sewing machine plate 114. The source of light 120 may have an adjustment means 122 so that the direction of the beam can be altered, depending upon need. In this way, the area being stitched is brightly illuminated. A bobbin 124 is supported by a frame member 126 attached to one edge of upper cross beam 16. Thread 128 is wound on the bobbin 118 and is guided by conventional means through the sewing machine head 110 and to the needle 112.

A color video camera 130 is mounted to an adjustable mounting bracket 132 which in turn is mounted to the upper cross beam 16. By way of example, adjustable mounting bracket 132 may contain an internal slide 134 and the video camera can be positioned along the slide at any desired location and rotated such that the focus of the color video camera 130 is directly at the intersection of the sewing needle 112 and the sewing machine plate 114. In this way, since the area is illuminated by the source of light 120, a clear picture of the sewing machine needle 112 performing a sewing or stitching operation can be picked up by the color video camera 130. The color video camera 130 is a high quality full color resolution camera. While a black and white video camera can be used, a color video camera is preferred for distinguishing shades in the fabric pattern. Extra wide angle lenses and/or telephoto lenses may be attached to the color video camera in order to display larger areas or more precise minute areas, as required for the specific operation. The color video camera 130 is in turn connected to the input of a color monitor 140 and the monitor is connected to an alternating current power source 150. When the color monitor 140 is turned on, the power to the color monitor 140 generates power to the color video camera 130 and the image of the sewing needle 112 and the stitching or sewing operation being performed is picked up by the video camera 130 and transmitted to the color monitor 140 where it can be easily viewed by an operator. Therefore, instead of requiring an operator to be physically above the large quilting table in order to see exactly where the sewing machine needle is stitching a pattern and seeing what pattern is being stitched, the operator merely needs to look at the monitor 140 in order to determine exactly where the needle is located and in what direction it is going so that the subsequent stitches can be accurately guided and made. As with the camera, a black and white monitor can be used, but a color monitor is preferred.

While it would be possible to physically move the quilting table 70 as the needle is sewing the pattern, it is not practical since the table is heavy and could not be moved fast enough by hand to quickly guide the portion of quilt 100 to the area where the sewing needle 112 is sewing the next stitch. Therefore, an automatic electrical system for moving the quilting table 70 and quilt 100 thereon into position for appropriate sewing of the pattern is required. A block diagram of the electronics for performing this operation is presented in FIG. 2. A source of alternating current power 150 energizes the entire system. As previously discussed, in one connection, the source of alternating current power 150 is connected to the monitor 140 which in turn energizes the video camera 130. In a second connection, the alternating current source is connected to an alternating current to direct current transformer 160. The transformer 160 is connected to an X-electronic interface card 162 which in turn is connected to an X-direction direct current motor 164. The transformer 160 is also connected to a Y-electronic interface card 166 which in turn is connected to a Y-direction direct current motor 168. The X-electronic interface card 162 and the Y-electronic interface card 166 are both connected to a joy stick electronic interface card 170. The joy stick electronic interface card 170 is connected to a joy stick 180. The joy stick electronic interface card 170 is also connected to the AC to DC transformer 160 and is also connected to the sewing machine head 110. The joy stick 180 is a bi-directional joy stick with a variable speed range to permit the operator to make high-speed and low-speed moves of the table. By way of example, the high-speed may be set to a maximum diagonal speed of approximately twenty-five feet per minute. Limit switches may be included to prevent the table's overtravel. The joy stick 180 through the joy stick interface card 170 can also be used to control the speed of the sewing needle 110. The DC motors 164 and 168 may be variable speed motors which are coupled to the quilt table through conventional drive belts, gears and racks, as previously described. The mechanical portion of the drive system can be suitable for adaptation to a computer controlled servo system. The electronic control components including the AC to DC transformer 160, the X-electronic interface card 162, the Y-electronic interface card 166, the X-direction motor 164, the Y-direction motor 168 and the joy stick interface card 170 can all be housed in the larger supporting box member 14.

Therefore, through use of the present invention, an operator can hold the joy stick 180 in his/her hand and watch the color video monitor 140. With the color video camera 130, equipped if desired with a wide angle or telephoto lens, focusing on the area where the sewing needle 112 is sewing the quilt 100, and the area illuminated by the source of light 120, the operator receives a detailed and clear view of the sewing needle as it is sewing the stitch into the quilt. Through use of the joy stick 180 and joy stick interface card 170 connected to the sewing machine head 100, the speed of the needle can be varied according to the stitch desired. An individual pattern can be sewn as if by hand since the quilting table 70 can be guided in an X-direction or Y-direction or combination X-Y diagonally oriented direction by use of the joy stick 180 which through the joy stick interface card 170 activates the X-direction motor and the y-direction motor to engage the gear and rack system and cause the quilting table 70 to be moved in the X-direction, the Y-direction, and the XY combined direction, as previously described. Therefore, by watching the image on the monitor 140, the operator can cause the quilting table 70 and quilt 100 thereon to be moved in any desired direction relative to the sewing needle 112 so that an individual pattern of any desired shape and size can be sewn into the quilt 100. A microprocessor in the joy-stick interface card helps to control the speed of sewing and the movement of the bedspread or quilt affixed to the quilting table 70. As the quilting table 70 is moved, the bedspread or quilt 100 passes through the gap H and since the bedspread or quilt 100 is held only by its edges, the sewing machine needle 112 can sew through the bedspread or quilt 100 at any location in an unimpeded manner.

Through use of the present invention, the rate of production is at least three to five times greater than that of hand-guided skilled operators. The training time required to teach the operator to use the present system is only one week, as opposed to four to six months for a conventional system. The present system can even be used by a non-skilled operator instead of the high-skilled operators required to operate present day systems. The high resolution color video camera and monitor allow the operator to see close-up views of the sewing operation from any distance. The risk of injury to the operator is significantly reduced since the operator is positioned at a remote location from the sewing needle and the moving table and therefore does not come in contact or near contact with moving parts.

The present system can also be combined with well known preprogrammed computer controlled systems. The attachment from the joy stick interface card 170 can be attached to a computer which receives preprogrammed pattern. The computer can be programmed to move the quilting table 70 and quilt 100 relative to the sewing needle 112 and can be therefore programmed to stitch a preprogrammed pattern into the quilt or bedspread. Therefore, the preprogrammed patterns can be stitched into part of the quilt or bedspread and the precise individual hand sewn patterns can be sewn into another portion of the bedspread. After the programmed patterns are completed, the computer is disconnected and the joy stick reconnected to the joy stick interface card and the precise hand sewing is performed. Of course, the hand sewing can be done first and then the preprogrammed pattern can be sewn afterward by attachment of the computer.

Defined more broadly, the present invention is a frame quilting machine comprising: (a) a frame member for retaining a fabric; (b) said frame member mounted on a structure which can be moved in the X-direction, the Y-direction, or any X-Y combination direction; (c) a first cross beam extending horizontally over said frame member; (d) a second cross beam aligned parallel to said first cross beam and extending horizontally beneath said frame member; (e) a remote control apparatus for controlling the movement of said structure and said frame member to enable the frame member and the fabric retained thereon to be moved horizontally in the X-direction, the Y-direction, and any combination X-Y direction between said first cross beam and said second cross beam; (f) a sewing machine head attached to said first cross beam and having a source of thread; (g) a sewing needle extending from said sewing machine head and positioned to sew threads into said fabric while the frame member and structure move underneath said first cross beam and above said second cross beam; (h) a sewing machine plate attached to said second cross beam and aligned with said sewing machine head and sewing needle; (i) a source of illumination focused on the intersection of said sewing machine needle and fabric; (j) a video camera movably secured to said first cross beam and focused on the intersection of said sewing machine needle and fabric; and (k) said video camera connected to a monitor; (1) whereby an operator may view the needle sewing thread into the fabric on the video monitor and may control the movement of the frame and fabric relative to the sewing needle by said remote apparatus. The source of illumination can be attached to said first cross beam. The video camera is preferable a color video camera. In an optional feature, the video camera is equipped with a wide angle lens. The monitor is preferably a color monitor. The apparatus may further comprise a programmable computer connected to said apparatus whereby a preprogrammed pattern directed by the computer will cause the second structure to move in a desired pattern relative to said sewing needle. The fabric may be a bedspread or a quilt. In the preferred embodiment, said sewing machine head and said frame member are aligned such that said sewing needle is at the approximate center point of said fabric and said frame member can move relative to said sewing machine head and said sewing needle so as to permit the sewing needle to reach any portion of the surface area of the fabric. In the preferred embodiment, said remote control apparatus is a remote joy stick. The speed of said sewing needle may be controlled by said remote control apparatus.

The present invention may be even more broadly defined as an apparatus for sewing thread into fabric comprising: (a) a first structure supporting a sewing machine head having a sewing needle and a source of thread; (b) a second structure supporting the fabric in a position relative to said sewing needle so that thread may be sewn into the fabric; (c) said second structure capable of horizontal movement in the X-direction, the Y-direction, or any combination X-Y direction relative to said sewing needle; (d) a video camera focused on the location of the intersection of said sewing needle and said fabric; (e) said video camera connected to a monitor; and (f) a remote control apparatus for moving said second structure and the fabric retained thereon relative to said sewing needle so that said sewing needle may sew a pattern with said thread into said fabric; (g) whereby an operator may view the needle sewing thread into the fabric on the video monitor and may control the movement of the second structure and fabric relative to the sewing needle by said remote control apparatus. The apparatus may further comprise a source of illumination focused on the intersection of said sewing needle and said fabric, which source of illumination is preferably attached to said first structure. A video camera can be movably attached to said first structure.

As clearly shown in the above described apparatus, the present invention also encompasses the method of sewing a pattern into a fabric having a large surface comprising: (a) positioning a sewing machine head having a source of thread and a sewing needle relative to said fabric; (b) retaining said fabric on a movable structure which can be made to move in a horizontal direction relative to the sewing needle and which can cause a portion of the surface of the fabric to be reached by the sewing needle so that thread can be sewn into the fabric; (c) obtaining a video image of the intersection of the sewing needle and fabric; and (d) controlling the movement of the movable structure relative to the sewing needle by a remote control apparatus and determining the direction of movement based upon the video image of the intersection of the sewing needle and fabric. The method may further comprise illuminating the intersection of said sewing needle and said fabric. The method may further include a programmable computer whereby a preprogrammed pattern directed by the computer will cause the pattern to be sewn into the fabric by the sewing needle.

Of course the present invention is not intended to be restricted to any particular form or arrangement, or any specific embodiment disclosed herein, or any specific use, since the same may be modified in various particulars or relations without departing from the spirit or scope of the claimed invention hereinabove shown and described of which the apparatus is intended only for illustration and for disclosure of an operative embodiment and not to show all of the various forms or modification in which the invention might be embodied or operated.

The invention has been described in considerable detail in order to comply with the patent laws by providing full public disclosure of at least one of its forms. However, such detailed description is not intended in any way to limit the broad features or principles of the invention, or the scope of patent monopoly to be granted.

What is claimed is:

1. A frame quilting machine comprising:
   a. a frame member for retaining a fabric;
   b. said frame member mounted on a structure which can be moved in the X-direction, the Y-direction, or any X-Y combination direction;
   c. a first cross beam extending horizontally over said frame member;
   d. a second cross beam aligned parallel to said first cross beam and extending horizontally beneath said frame member;
   e. a remote control apparatus for controlling the movement of said structure and said frame member to enable the frame member and the fabric retained thereon to be moved horizontally in the X-direction, the Y-direction, and any combination X-Y direction between said first cross beam and said second cross beam;
   f. a sewing machine head attached to said first cross beam and having a source of thread;
   g. a sewing needle extending from said sewing machine head and positioned to sew threads into said fabric while the frame member and structure move underneath said first cross beam and above said second cross beam;

h. a sewing machine plate attached to said second cross beam and aligned with said sewing machine head and sewing needle;
i. a source of illumination focused on the intersection of said sewing machine needle and fabric;
j. a video camera movably secured to said first cross beam and focused on the intersection of said sewing machine needle and fabric; and
k. said video camera connected to a monitor;
l. whereby an operator may view the needle sewing thread into the fabric on the video monitor and may control the movement of the frame and fabric relative to the sewing needle by said remote apparatus.

2. An apparatus in accordance with claim 1 wherein said source of illumination is attached to said first cross beam.

3. An apparatus in accordance with claim 1 wherein said video camera is a color video camera.

4. An apparatus in accordance with claim 1 wherein said video camera is equipped with a wide angle lens.

5. An apparatus in accordance with claim 3 wherein said monitor is a color monitor.

6. An apparatus in accordance with claim 1 further comprising a programmable computer connected to said apparatus whereby a preprogrammed pattern directed by the computer will cause the second structure to move in a desired pattern relative to said sewing needle.

7. An apparatus in accordance with claim 1 wherein said fabric is a bedspread.

8. An apparatus in accordance with claim 1 wherein said fabric is a quilt.

9. An apparatus in accordance with claim 1 wherein said sewing machine head and said frame member are aligned such that said sewing needle is at the approximate center point of said fabric and said frame member can move relative to said sewing machine head and said sewing needle so as to permit the sewing needle to reach any portion of the surface area of the fabric.

10. An apparatus in accordance with claim 1 wherein said remote control apparatus is a remote joy stick.

11. An apparatus in accordance with claim 1 wherein the speed of said sewing needle is controlled by said remote control apparatus.

12. An apparatus for sewing thread into fabric comprising:
a. a first structure supporting a sewing machine head having a sewing needle and a source of thread;
b. a second structure supporting the fabric in a position relative to said sewing needle so that thread may be sewn into the fabric;
c. said second structure capable of horizontal movement in the X-direction, the Y-direction, or any combination X-Y direction relative to said sewing needle;
d. a video camera focused on the location of the intersection of said sewing needle and said fabric;
e. said video camera connected to a monitor; and
f. a manually operated remote control apparatus for moving said second structure and the fabric retained thereon relative to said sewing needle so that said sewing needle may sew a pattern with said thread into said fabric;
g. whereby an operator may view the needle sewing thread into the fabric on the video monitor and may control the movement of the second structure and fabric relative to the sewing needle by said remote control apparatus.

13. An apparatus in accordance with claim 12 further comprising a source of illumination focused on the intersection of said sewing needle and said fabric.

14. An apparatus in accordance with claim 13 wherein said source of illumination is attached to said first structure.

15. An apparatus in accordance with claim 12 wherein said video camera is movably attached to said first structure.

16. An apparatus in accordance with claim 12 wherein said video camera is a color video camera.

17. An apparatus in accordance with claim 12 wherein said video camera is equipped with a wide angle lens.

18. An apparatus in accordance with claim 16 wherein said monitor is a color monitor.

19. An apparatus in accordance with claim 12 further comprising a programmable computer connected to said apparatus whereby a preprogrammed pattern directed by the computer will cause the second structure to move in a desired pattern relative to said sewing needle.

20. An apparatus in accordance with claim 12 wherein said fabric is a bedspread.

21. An apparatus in accordance with claim 12 wherein said fabric is a quilt.

22. An apparatus in accordance with claim 12 wherein said first structure and said second structure are aligned such that said sewing needle is at the approximate center point of said fabric and said second structure can move relative to said first structure and said sewing needle so as to permit the sewing needle to reach any portion of the surface area of the fabric.

23. An apparatus in accordance with claim 12 wherein said remote control apparatus is a remote joy stick.

24. An apparatus in accordance with claim 12 wherein the speed of said sewing needle is controlled by said remote control apparatus.

25. The method of sewing a pattern into a fabric having a large surface comprising:
a. positioning a sewing machine head having a source of thread and a sewing needle relative to said fabric;
b. retaining said fabric on a movable structure which can be made to move in a horizontal direction relative to the sewing needle and which can cause a portion of the surface of the fabric to be reached by the sewing needle so that thread can be sewn into the fabric;
c. obtaining an electronically generated video image of the intersection of the sewing needle and fabric; and
d. controlling the movement of the movable structure relative to the sewing needle by a manually operated remote control apparatus and determining the direction of movement based upon the video image of the intersection of the sewing needle and fabric.

26. The method in accordance with claim 25, further comprising illuminating the intersection of said sewing needle and said fabric.

27. The method in accordance with claim 25, further comprising a programmable computer whereby a preprogrammed pattern directed by the computer will cause the pattern to be sewn into the fabric by the sewing needle.

28. A frame quilting machine comprising:
a. a frame member for retaining a fabric;
b. said frame member mounted on a structure which can be moved in the X-direction, the Y-direction, or any X-Y combination direction;
c. a first cross beam extending horizontally over said frame member;
d. a second cross beam aligned parallel to said first cross beam and extending horizontally beneath said frame member;
e. a remote control apparatus for controlling the movement of said structure and said frame member to enable the frame member and the fabric retained thereon to be moved horizontally in the X-direction, the Y-direction, and any combination X-Y direction between said first cross beam and said second cross beam;
f. a sewing machine head attached to said first cross beam and having a source of thread;
g. a sewing needle extending form said sewing machine head and positioned to sew threads into said fabric while the frame member and structure move underneath said first cross beam and above said second cross beam; and
h. a sewing machine plate attached to said second cross beam and aligned with said sewing machine head and sewing needle;
i. whereby an operator may control the movement of the frame and fabric relative to the sewing needle by said remote apparatus.

29. An apparatus in accordance with claim 28 wherein said remote control apparatus is a remote joy stick.

30. An apparatus in accordance with claim 29 further comprising a programmable computer connected to said apparatus whereby a perprogrammed pattern directed by the computer will cause the second structure to move in a desired pattern relative to said sewing needle.

31. An apparatus in accordance with claim 29 wherein said sewing machine head and said frame member are aligned such that said sewing needle is at the approximate center point of said fabric and said frame member can move relative to said sewing machine head and said sewing needle so as to permit the sewing needle to reach any portion of the surface area of the fabric.

* * * * *